US012779987B2

(12) United States Patent
Farmer et al.

(10) Patent No.: US 12,779,987 B2
(45) Date of Patent: Nov. 3, 2026

(54) FUEL TANK ASSEMBLY

(71) Applicant: Textron Ground Support Equipment Inc., Cartersville, GA (US)

(72) Inventors: Caleb Smith Farmer, Cartersville, GA (US); Brian Yoder, Cartersville, GA (US)

(73) Assignee: Textron Ground Support Equipment Inc., Cartersville, GA (US)

( * ) Notice: Subject to any disclaimer, the term of this patent is extended or adjusted under 35 U.S.C. 154(b) by 174 days.

(21) Appl. No.: 18/955,212

(22) Filed: Nov. 21, 2024

(65) Prior Publication Data

US 2026/0138441 A1 May 21, 2026

(51) Int. Cl.
*B60K 15/073* (2006.01)
*F02M 37/00* (2006.01)
*B60K 15/03* (2006.01)

(52) U.S. Cl.
CPC ....... *B60K 15/073* (2013.01); *F02M 37/0052* (2013.01); *F02M 37/0076* (2013.01); *B60K 2015/03243* (2013.01); *B60K 2015/03328* (2013.01)

(58) Field of Classification Search
CPC ........ B60K 15/073; B60K 2015/03243; B60K 2015/03328; B60K 15/063; B60K 2015/03111; B60K 2015/0634; B60K 15/01; B60K 15/03; F02M 37/0052; F02M 37/0076; F02M 37/106; F02M 37/0082; F02M 37/0088; F02M 37/0017; F02M 37/0047; F02M 37/20; F02M 37/00; F02M 37/04; F02M 59/44; F02M 69/462; F02M 33/08
See application file for complete search history.

(56) References Cited

U.S. PATENT DOCUMENTS 2,139,370 A * 12/1938 Lauer ..................... F02M 37/10 222/189.11
2,975,713 A * 3/1961 Wright ................... F02M 37/08 310/104
6,436,287 B1 * 8/2002 Fischerkeller ......... F02M 37/50 210/232
6,945,422 B2 * 9/2005 Beyer .................... F02M 37/10 220/562
11,280,305 B2 * 3/2022 Rihtar .................... B60K 15/01

FOREIGN PATENT DOCUMENTS

CN 101559713 B * 9/2013 ............. F02M 25/08
CN 109630333 A * 4/2019 ........... F02M 37/103
EP 2030883 A1 * 3/2009 .............. B62J 23/00

OTHER PUBLICATIONS

CN-109630333-A English Translation (Year: 2019).*
EP-2030883-A1 English Translation (Year: 2009).*
CN-101559713-B English Translation (Year: 2013).*

* cited by examiner

*Primary Examiner* — Michael T. Walsh
(74) *Attorney, Agent, or Firm* — Sandberg Phoenix & von Gontard P.C.

(57) ABSTRACT

A fuel tank assembly, wherein the assembly comprises a fuel tank having one or more walls, a fuel pump disposed within an interior space of the fuel tank, and a tank supply port disposed in and extending through a wall of the one or more walls and fluidly connected to the fuel pump. The fuel tank assembly additionally comprises an engine supply conduit that is connectable to the tank supply port such that the engine supply conduit is fluidly connected to the fuel pump.

20 Claims, 10 Drawing Sheets

FUEL TANK ASSEMBLY

FIELD

The present teachings relate to fuel tank assemblies, and more particularly to a fuel tank assembly for ground support vehicles that is designed to prevent vapor locks in the fuel lines thereof.

BACKGROUND

The statements in this section merely provide background information related to the present disclosure and may not constitute prior art.

Presently, most fuel tank assemblies for ground support vehicles use a configuration where fuel components, specifically the fuel pump and fuel lines, are affixed to an exterior of the vehicle fuel tank, or comparatively, on the chassis of the vehicle exterior to the fuel tank where they exposed to the ambient environment. For example, in various known fuel tank assemblies the fuel pump is normally located, exterior to and downstream from the fuel tank. Such known fuel tank assemblies often develop vapor locks in the exterior fuel line due to changing temperatures and harsh weather elements.

SUMMARY

The present disclosure generally provides a fuel tank assembly designed and configured to address the problems described above. Particularly, the present disclosure provides a fuel tank assembly that comprises an in-tank fuel pump wherein the fuel pump is disposed and fixed within an interior of the fuel tank.

For example, in various embodiments, the present disclosure provides a fuel tank assembly that comprises a fuel tank having one or more wall, a fuel pump disposed within an interior space of the fuel tank, and a tank supply port disposed in and extending through a wall of the one or more walls, wherein the tank supply port fluidly connected to the fuel pump. In such embodiments, the fuel tank assembly additionally comprises an engine supply conduit connectable to the tank supply port such that the engine supply conduit is fluidly connected to the fuel pump.

In various other embodiments, the present disclosure provides a fuel tank assembly that comprises a fuel tank having at least one wall, a fuel pump disposed within an interior space of the fuel tank, and a tank supply port disposed in and extending through one of a wall of the one or more walls of the fuel tank, wherein the tank supply port fluidly connected to the fuel pump. In such embodiments the fuel tank assembly additionally comprises an engine supply conduit connectable to the tank supply port such that the engine supply conduit is fluidly connected to the fuel pump, and a pump egress supply conduit that is removably connectable at a first end to a pump egress port, and removably connectable at a second end to a tank reentry port such that the pump egress supply conduit is disposed exteriorly to the fuel tank and is fluidly connected to the fuel pump. Furthermore, in such embodiments, the fuel tank assembly comprises an interstitial supply conduit that is connected at a first end to the reentry port, and connected at a second end to the tank supply port such that the interstitial supply conduit is disposed within the interior space of the fuel tank and is fluidly connected to the fuel pump, thereby fluidly connecting the engine supply conduit to the fuel pump.

In yet other embodiments, the present disclosure provides a vehicle that comprises a chassis, a plurality of wheels operatively connected to the chassis, a passenger compartment supported by the chassis, and a fuel tank assembly. In such embodiments, the fuel tank assembly comprises a fuel tank having at least one wall, a fuel pump disposed within an interior space of the fuel tank, a tank supply port disposed in and extending through a wall of the one or more walls of the fuel tank, the tank supply port fluidly connected to the fuel pump, and an engine supply conduit connectable to the tank supply port such that the engine supply conduit is fluidly connected to the fuel pump.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

BRIEF DESCRIPTION OF DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
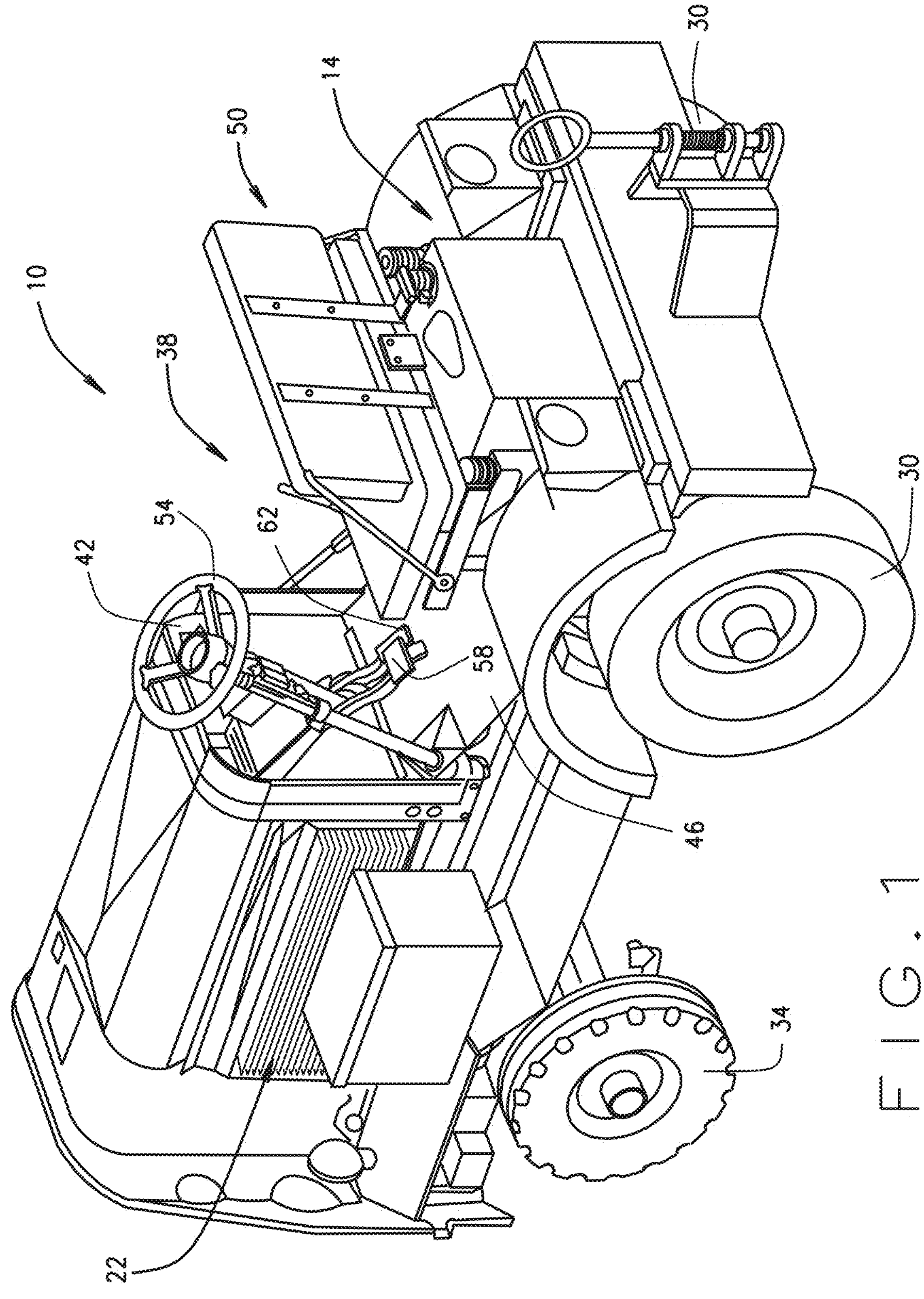
FIG. 1 is an isometric view of an exemplary vehicle comprising a fuel tank assembly of the present disclosure, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
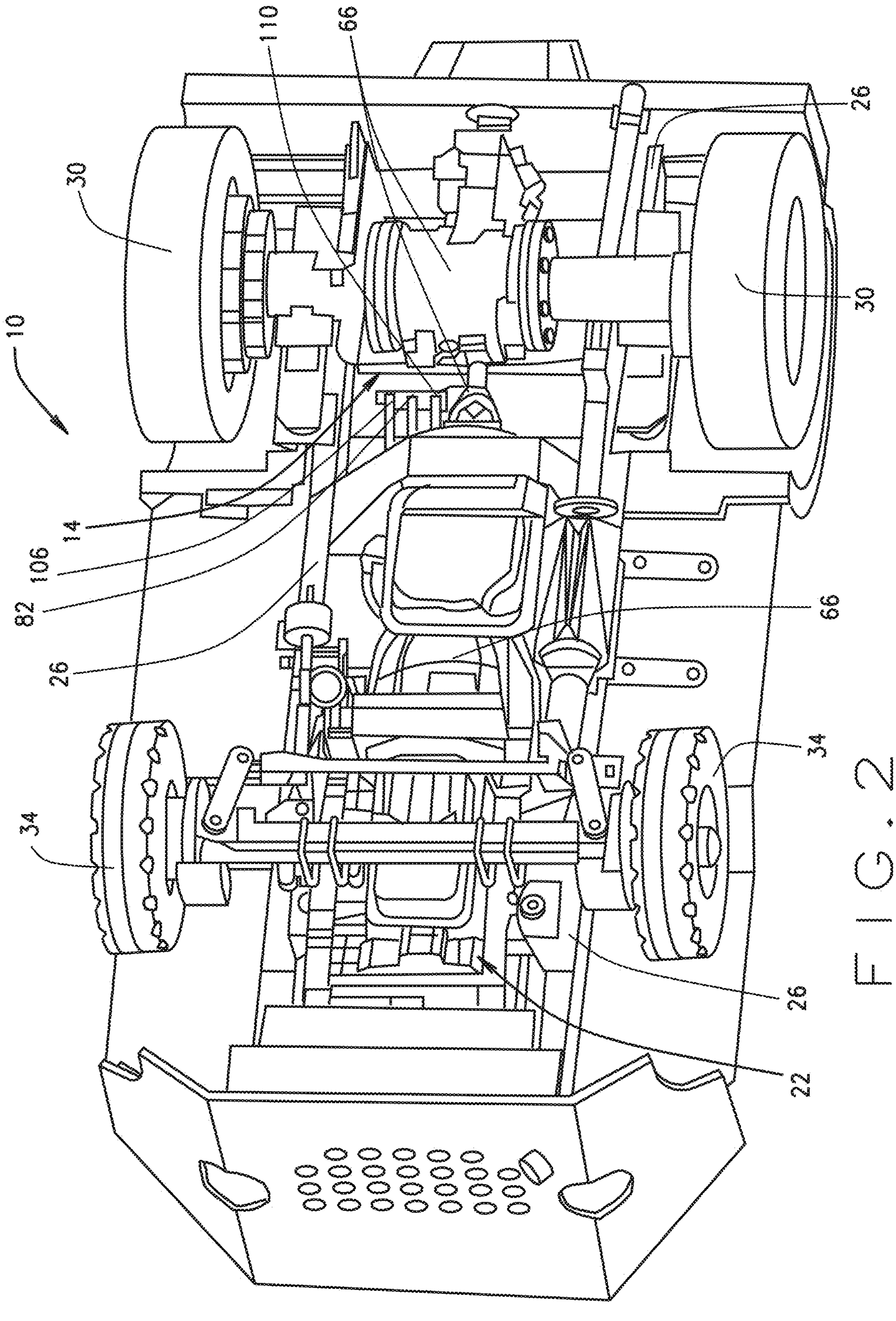
FIG. 2 is an isometric view of the vehicle shown in FIG. 1 illustrating a portion of a bottom of a fuel tank of the fuel tank assembly, wherein the bottom includes a plurality of fuel ports, in accordance with various embodiments of the present disclosure.
Figure 3:
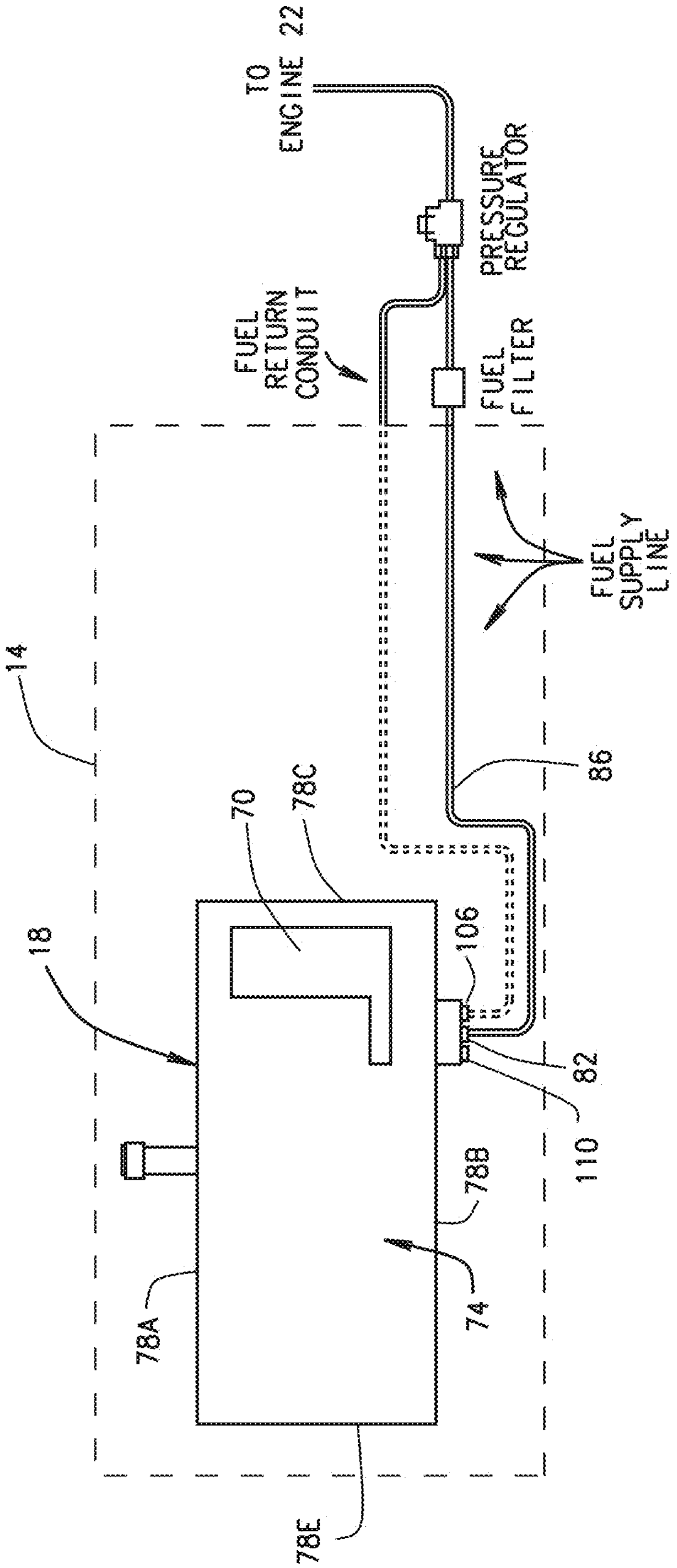
FIG. 3 is a block diagram of the fuel tank assembly, in accordance with various embodiments of the present disclosure.

Referring to FIGS. 1, 2 and 3, in various embodiments, the present disclosure generally provides a vehicle 10, comprising a fuel tank assembly 14 that can be installed into the vehicle 10 during initial assembly of the vehicle 10 or retrofit into an existing previously assembled vehicle 10. The fuel tank assembly 10 is structured and operable to prevent vapor lock within the fuel lines (referred to herein as conduits or fuel conduits), which can comprise rigid and/or flexible tubing or hoses that carry fuel (e.g., gasoline) to and from a fuel tank 18 of the fuel tank assembly 14 to and from an engine 22 of the vehicle 10 (e.g., an internal combustion engine). The engine 22 being structured and operable to utilize the fuel to provide motive force to the vehicle 10. The vehicle 10 can be any vehicle that is subject to use in harsh temperature environments and is suitable for installation and use of fuel tank assembly 14 as described herein, and remain within the scope of the present disclosure. For example, in various embodiments, the vehicle 10 can be a ground support vehicle such as those used at airport to perform various tasks on the airport tarmac. For instance, the vehicle 10 can be a baggage tractor, a cargo tractor, an aircraft tug/pushback tractor, a belt loader, a snow plow, a deicing vehicle, a refueling vehicle, aircraft lavatory servicing vehicles, etc.

The vehicle 10 generally includes a chassis or frame 26, a pair of rear wheels 30 and a pair of front wheels 34 that are operationally connected to the chassis 26, and a passenger area or compartment 38. The passenger compartment 38 generally includes an instrument panel or dash console 42, a floorboard 46, and an operator or passenger seating structure 50. The instrument panel/dash console 42 can include one or more instrument displays, gauges, vehicle control devices and/or storage compartments. The passenger compartment 38 additionally includes a steering wheel 54 for use by the passenger/operator to control the directional movement of the vehicle 10, a brake pedal 58 for use by the passenger/operator to control slowing and stopping of the vehicle 10, and an accelerator pedal 62 for use by the passenger/operator to control the torque delivered by a engine 22 to one or more of the rear and/or front wheels 30 and/or 34. Particularly, the engine 22 is operatively connected to a drivetrain 66 that is operatively connected between the engine 22 and at least one of the rear and/or front wheels 34 and/or 30.

Figure 4:
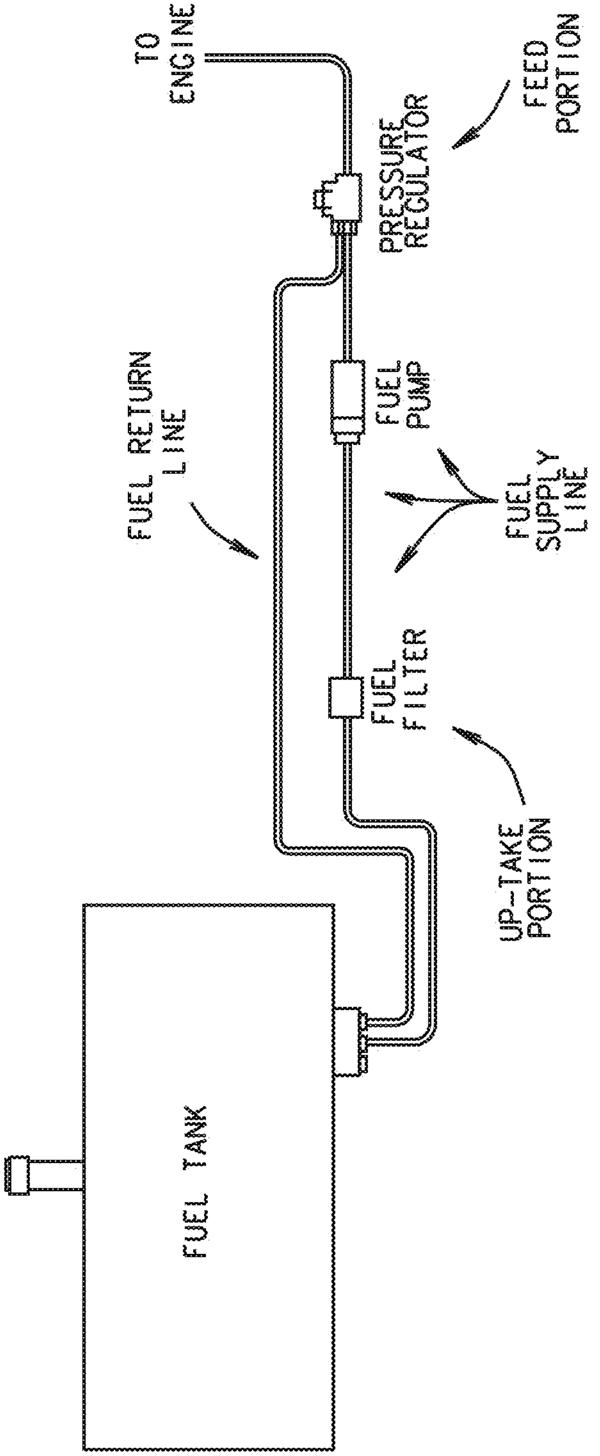
FIG. 4 PRIOR ART
FIG. 4 is a block diagram of an exemplary prior art fuel system.

As described above, the fuel tank assembly 10 is structured and operable to prevent vapor lock within the fuel lines (e.g., fuel conduits) that carry fuel to and from the fuel tank 18 of the fuel tank assembly 14 to and from the engine 22 of the vehicle 10. More specifically, with reference to FIG. 4 that illustrates an exemplary known fuel system for a vehicle such as vehicle 10. Known fuel systems generally comprise a fuel tank for retaining fuel, a fuel supply line that carries fuel from the fuel tank and supplies the fuel to the engine, and a fuel return line that carries excess fuel back to the fuel tank. The fuel supply line is exterior to the fuel tank such that it is exposed to the elements of the ambient environment (e.g., extreme heat, extreme cold and changes in temperature therebetween). The fuel supply line typically includes a non-pressurized up-take section that can be connected between the fuel tank and a fuel pump, and a pressurized feed section connected between the fuel pump and engine. In various known embodiments, the non-pressurized up-take section can include an in-line filter. In various known embodiments, the pressurized feed section can include a pressure regulator. The fuel pump in known fuel systems is structured and operable to draw fuel from the fuel tank and through the up-take portion of the fuel line then push, force or pump the fuel to the engine. As one skilled in the art would readily understand, the fuel being drawn through the up-take portion of the fuel line is not pressurized, while the fuel being pumped through the feed portion of the fuel line is pressurized. As described above the up-take portion of the fuel line, the fuel pump and feed portion of the fuel line are all exterior to the fuel tank and exposed to the elements of the ambient environment (e.g., extreme heat, extreme cold and changes in temperature therebetween). As one skilled in the art would further readily understand, extreme heat and cold and change in temperature therebetween can cause vapor bubbles of vapor lock within the unpressurized up-take portion of the fuel line. The fuel tank assembly of the present disclosure is structured and operable to prevent vapor bubbles and vapor lock in any portion of the fuel system of the vehicle 10 in which it is installed.

Referring now to FIGS. 3, 5, 6 and 7, in addition to the fuel tank 18, the fuel tank assembly 14 comprises a fuel pump 70 disposed within an interior space 74 of the fuel tank 18 that is defined by one or more tank walls 78. The fuel tank 18 can have generally any shape and be of any size suitable to be functionally accommodated by the vehicle 10 in which it is disposed. For example, the fuel tank can have the shape of sphere, a cylinder with flat or semi-hemispherical ends, a triangular prism, a cube, a rectangular cuboid, a cone, an ellipsoid, or any other desired functional shape and remain within the scope of the present disclosure. For simplicity, the fuel tank 18 will be exemplarily illustrated and described herein as having the shape of a cube or a rectangular cuboid having 6 walls 78, i.e., a top wall 78A, a bottom wall 78B, a first sidewall 78C, a second sidewall 78D, a third sidewall 78E and a fourth sidewall 78F. The fuel tank assembly 14 additionally comprises a tank supply port that is fluidly connected to the fuel pump 82. In embodiments wherein the fuel tank 18 has a single wall, the tank supply port 82 is disposed in and extends through the tank wall. In embodiments wherein the fuel tank 18 has more than one wall (i.e., a plurality of walls), the tank supply port is disposed in and extends through one of the plurality of walls of the fuel tank 18. The fuel tank assembly 14 further comprises an engine supply conduit 86 connectable to the tank supply port 82 such that the engine supply conduit 86 is fluidly connected to the fuel pump 70. More particularly, the engine supply conduit 86 is connected at a first end to the tank supply port 82 and, in various embodiments, is connected at an opposing second end to a fuel filter that is fluidly connected, via fuel conduit (e.g., fuel tubing of hose) to a pressure regulator that is fluidly connected to the vehicle engine 22. Alternatively, the fuel filter can be removed such that the second end of the engine supply conduit 86 is connected to the pressure regulator. An output of the pressure regulator is fluidly connected, via fuel conduit, to an engine fuel input system (e.g., fuel injector system) of the engine 22. The combination of the engine supply conduit 86, the fuel filter (if applicable), the pressure regulator, the fuel conduit between the fuel filter and the fuel regulator (if applicable), and the fuel conduit between the pressure regulator and the engine fuel input system is comprehensively referred to herein as the fuel supply line.

The tank supply port 82 is fluidly connected to the fuel pump 70 via any suitable fluid connection means or method. For example, in various embodiments, the fuel pump 70 can be directly connected to the tank supply port 82 such that the fuel pump 70 is structured and operable to pump fuel from within the fuel tank interior space 74 out of the fuel tank 18 through the tank supply port 82. Alternatively, in various embodiments, the fuel pump 70 can be fluidly connected to the tank supply port 82 via an interior fuel conduit (e.g., tube or hose) disposed within the fuel tank interior space 74 and connected to the fuel pump at a first end and to the tank supply port 82 at an opposing second end. Accordingly, the fuel pump 70 and the interior fuel conduit are structured and operable to pump fuel from within the fuel tank interior space 74 out of the fuel tank 18 through the tank supply port 82.

Figure 5:
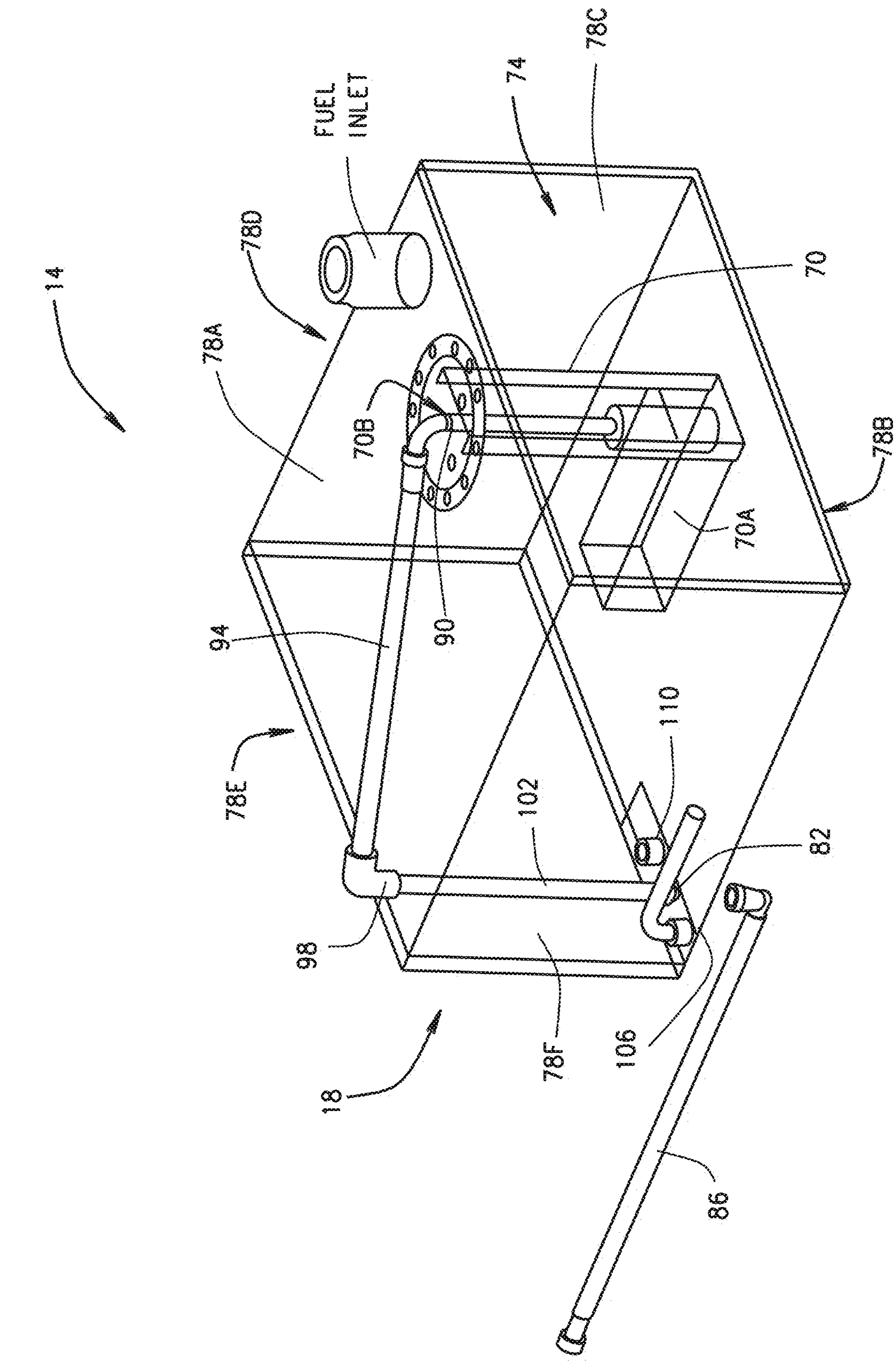
FIG. 5 is an exemplary isometric view of the fuel tank assembly having the fuel tank in transparency so as to exemplarily illustrated a fuel pump disposed within an internal space of the fuel tank, in accordance with various embodiments of the present disclosure.
Figure 6:
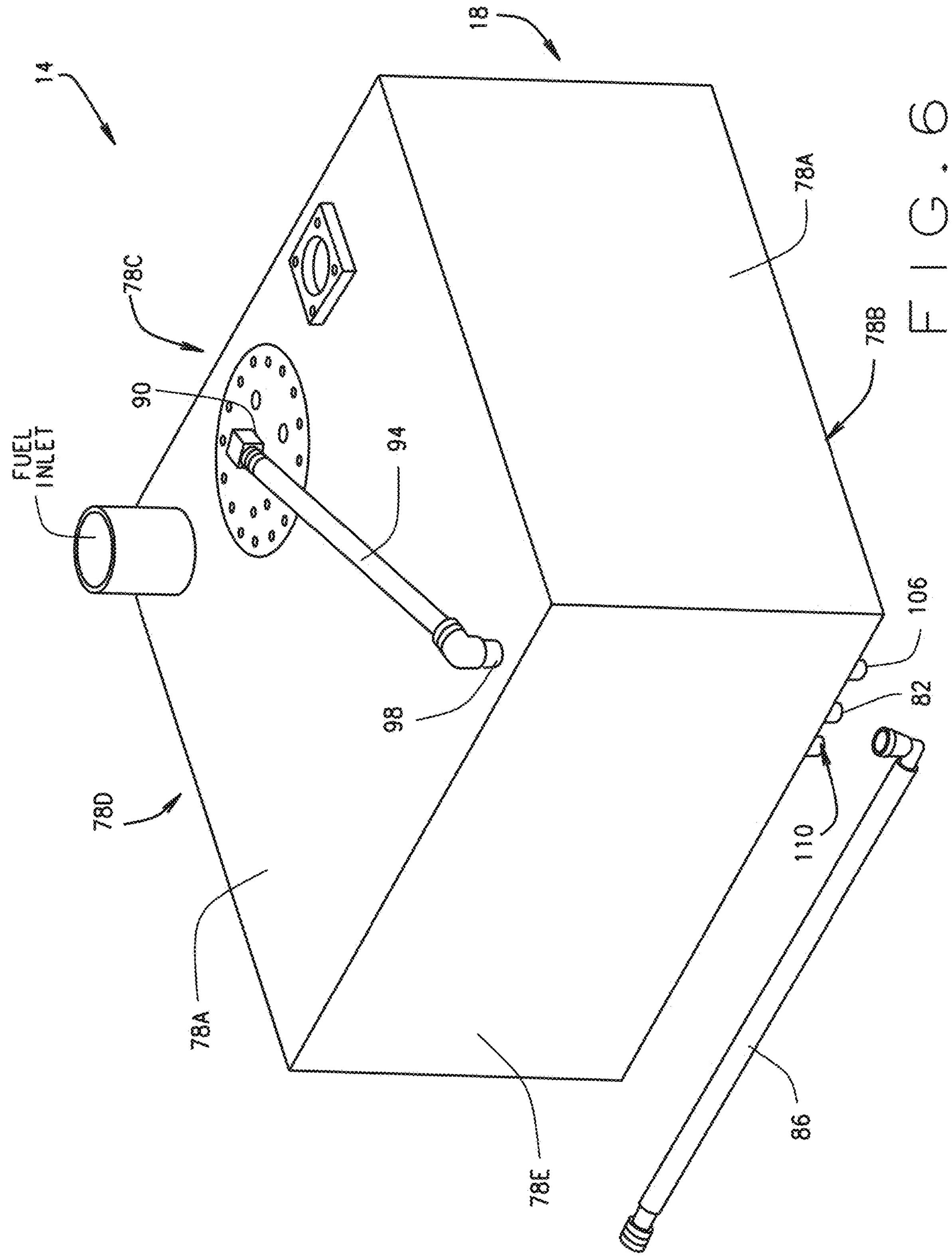
FIG. 6 is an exemplary isometric solid view of the fuel tank assembly shown in FIG. 5, in accordance with various embodiments of the present disclosure.
Figure 7:
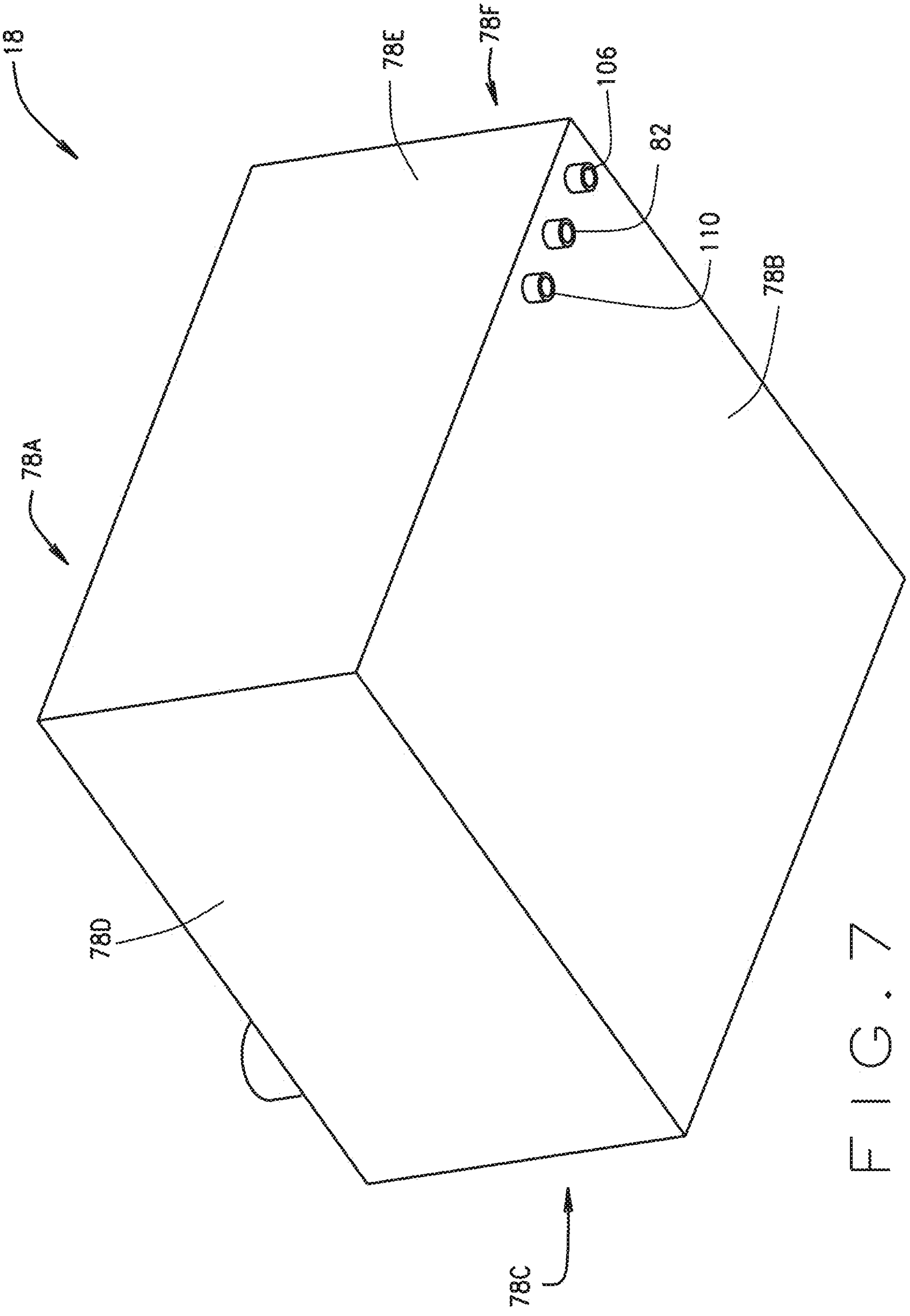
FIG. 7 is an exemplary isometric bottom view of the fuel tank shown in FIGS. 5 and 6, in accordance with various embodiments of the present disclosure.

In still yet other embodiments, as exemplarily illustrated in FIGS. 5 and 6, the fuel pump 70 can be structured to have an uptake base 70A and an output nozzle 70B whereby the fuel pump 70 functions to uptake or draw fuel into the pump via the uptake base 70A and output the drawn fuel with force, i.e., under pressure, from the output nozzle 70B. In such embodiments, the fuel pump output nozzle 70B can be connected to a pump egress port 90 disposed in and extending through the tank wall (in embodiments wherein the fuel tank 18 has a single wall), or is disposed in and extending through one of the plurality of walls of the fuel tank 18 (in embodiments wherein the fuel tank 18 has more than one wall) as exemplarily illustrated in FIGS. 5 and 6. Additionally, in such embodiments the fuel tank assembly 14 can comprise pump egress supply conduit 94 that is removably connectable at a first end to the pump egress port 90, and removably connectable at a second end to a tank reentry port 98 such that the pump egress supply conduit 94 is disposed exteriorly to the fuel tank 18 and is fluidly connected to the fuel pump 70. The tank reentry port 98 is disposed in and extends through the tank wall (in embodiments wherein the fuel tank 18 has a single wall), or is disposed in and extends through the same one of the plurality of walls of the fuel tank 18 as the pump egress port 90 (in embodiments wherein the fuel tank 18 has more than one wall) as exemplarily illustrated in FIGS. 5 and 6. Furthermore, in such embodiments the fuel tank assembly 14 can comprise an interstitial supply conduit 102 that is connected at a first end to the reentry port 98 and connected at a second end to the tank supply port 82, and such that the interstitial supply conduit 102 is disposed within the interior space 74 of the fuel tank and is fluidly connected to the fuel pump 70, thereby fluidly connecting the engine supply conduit 86 to the fuel pump 70.

In various embodiments, the fuel tank assembly 14 can comprise a fuel return port 106 that is connectable to a fuel return conduit of the vehicle 10 that is connectable to the pressure regulator such that the pressure regulator can direct excess fuel to be returned to the fuel tank 18. The fuel return port 106 is disposed in and extends through the tank wall (in embodiments wherein the fuel tank 18 has a single wall), or is disposed in and extends through one of the plurality of walls of the fuel tank 18 (in embodiments wherein the fuel tank 18 has more than one wall) as exemplarily illustrated in FIGS. 5 and 6. For example, in the embodiments wherein the fuel tank 18 comprises a plurality of walls as exemplarily illustrated in FIGS. 5 and 6 the fuel return port 106 can be disposed in and extend through the same wall as the tank supply port 82 or a different wall than the tank supply port 82. Additionally, in various embodiments, the fuel tank assembly 14 can comprise a fuel drain port 110 that is structured and operable to provide controllable fuel drainage from the fuel tank 18. The fuel drain port 110 is disposed in and extends through the tank wall (in embodiments wherein the fuel tank 18 has a single wall), or is disposed in and extends through one of the plurality of walls of the fuel tank 18 (in embodiments wherein the fuel tank 18 has more than one wall) as exemplarily illustrated in FIGS. 5 and 6. For example, in the embodiments wherein the fuel tank 18 comprises a plurality of walls as exemplarily illustrated in FIGS. 5 and 6 the fuel drain port 110 can be disposed in and extend through the same wall the tank supply port 82 and/or the fuel return port 106, or a different wall of the tank supply port 82 and/or the fuel return port 106.

Figure 8:
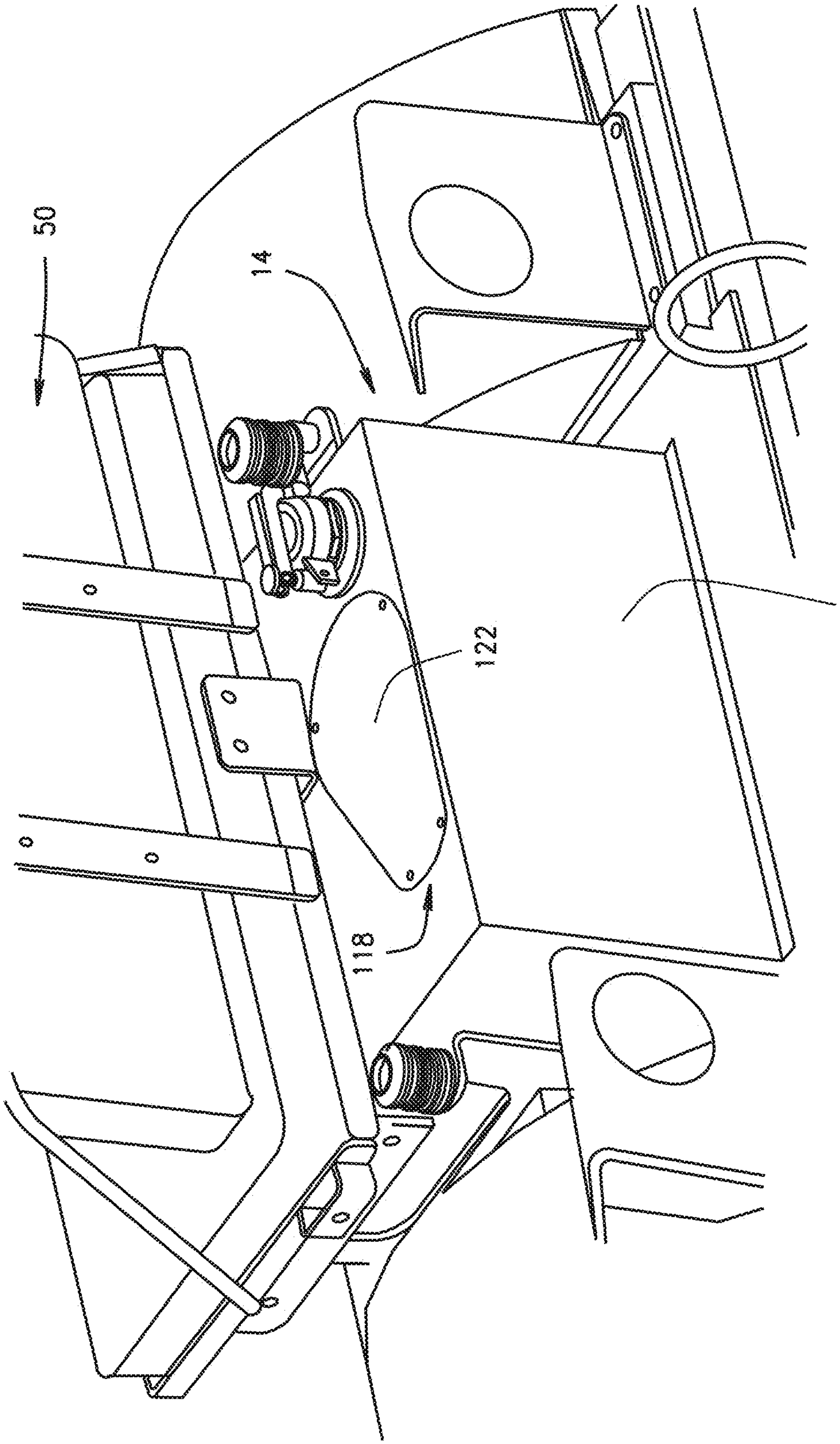
FIG. 8 is an exemplary illustration of the fuel tank housed within a protective cover and disposed under a seating structure of the vehicle, in accordance with various embodiments of the present disclosure.
Figure 9:
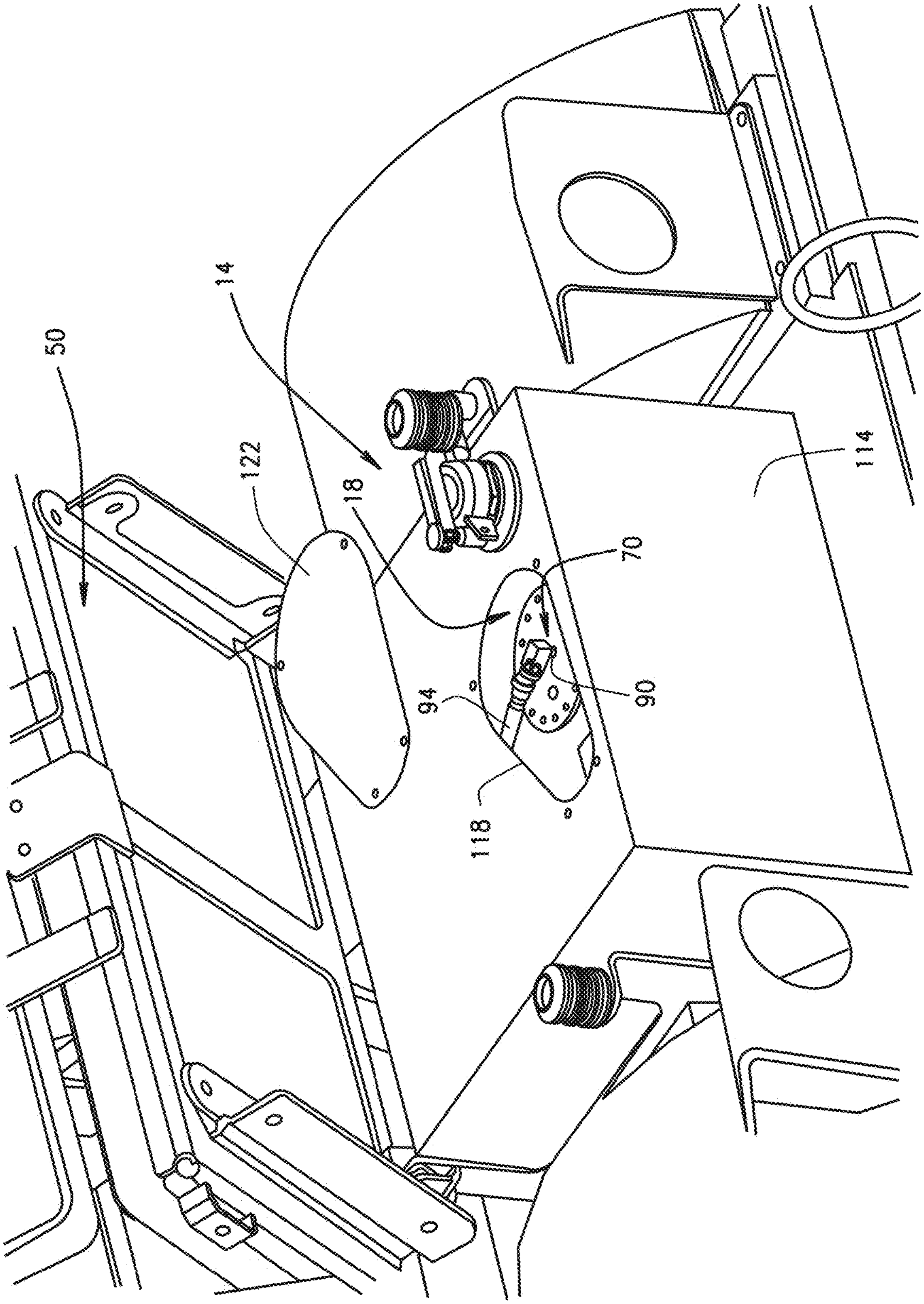
FIG. 9 is an exemplary illustration of the fuel tank and protective cover disposed under the vehicle seating structure as shown in FIG. 9, wherein the vehicle seating structure is in an raised position, in accordance with various embodiments of the present disclosure.
Figure 10:
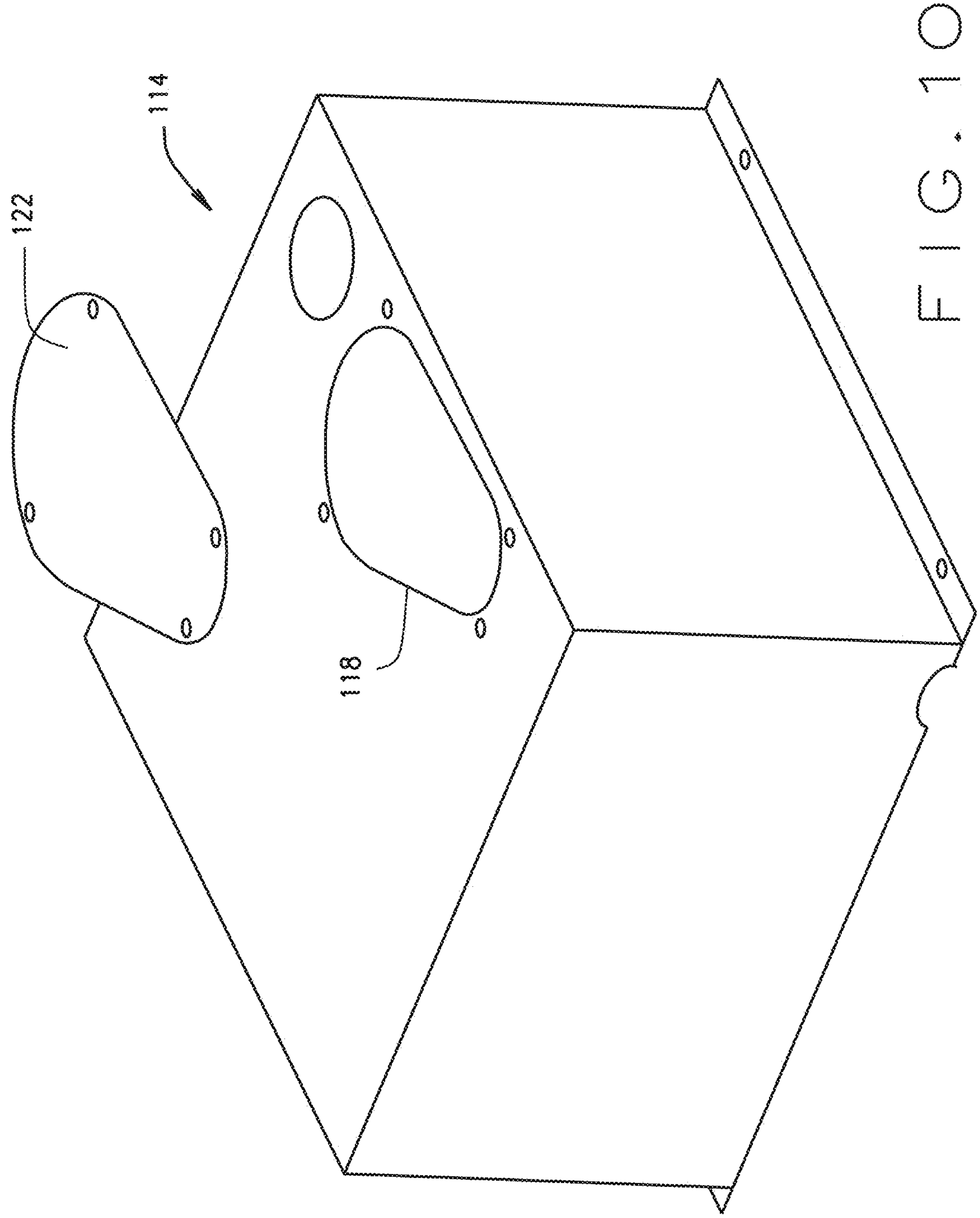
FIG. 10 is an exemplary isometric view of the fuel tank protective cover, in accordance with various embodiments of the present disclosure.

Referring now to FIGS. 8, 9 and 10, in various embodiments the fuel tank 18 of the fuel tank assembly 14 described herein can be disposed on the vehicle 10 under the seating structure 50 of the vehicle 10, wherein the seating structure 50 is movable between a lowered position (FIG. 8) and a raised position (FIG. 9). In various embodiments, the fuel tank assembly 14 can further comprise a protective fuel tank cover 114 that is structured and operable to be disposed over at least a portion of the fuel tank 18 when the fuel tank is secured to a vehicle 10 and to protect the fuel tank 18 from damage. In various embodiments, the fuel tank cover 114 can be mounted to the vehicle chassis 26 and/or a fuel tank platform and/or any other structure of the vehicle 10 such that the fuel tank cover 114 aids in securing the fuel tank 18 to the vehicle chassis 26 and/or a fuel tank platform and/or any other structure of the vehicle 10. As described above, the protective fuel tank cover 114 is structured and operable to be disposed at least a portion of the fuel tank 18, for example, in embodiments wherein the fuel tank 18 is multi-sided (e.g., a rectangular cuboid) the fuel tank cover can be structured and operable to cover at least 2 sides of the fuel tank 18. Accordingly, the fuel tank cover 114 can comprise two, three, four or five sides and be configured to cover and protect two, three, four or five sides of the fuel tank 18. The fuel tank cover 114 can be constructed of any material suitable to provide protection from damage to the fuel tank 18 from such things as falling debris or other objects, contact or collisions with other vehicles or ground support equipment, etc. For example, the fuel tank cover 114 can be constructed of steel, aluminum, galvanized sheet metal, a composite material, etc.

In various embodiments, the fuel tank cover 114 can comprise an access opening 118 formed therewithin to provide access to the fuel pump 70 and/or other components of the fuel tank assembly 14 described herein. Additionally, in various embodiments, fuel tank cover 114 additionally comprises a removable access opening cover plate that is removably connectable to the protective fuel tank cover 114 to cover the access opening.

As described above the fuel tank assembly 14 is structured and operable to prevent vapor lock from occurring within the fuel supply line (e.g., the combination of the engine supply conduit 86, the fuel filter (if applicable), the pressure regulator, the fuel conduit between the fuel filter and the fuel regulator (if applicable), and the fuel conduit between the pressure regulator and the engine fuel input system) and the fuel return conduit. Specifically, to prevent vapor lock the fuel tank assembly 14 is structured and operable to pressurize the fuel supply line and the fuel return conduit such that changes in the temperature of the ambient environment will not cause the fuel flowing within the fuel supply line and the fuel return conduit to develop vapor pockets or bubbles that cause vapor lock. More specifically, having the fuel pump 70 disposed within the fuel tank 18 puts the fuel under pressure as it exits the fuel tank 18. Still more specifically, the fuel pump 70 draws fuel from within the fuel tank 18 and pumps or forces the fuel under pressure out of the fuel tank 18 into the engine supply conduit 86. Therefore, the fuel is pressurized as it is pumped or forced out of the tank by the fuel pump 70 and remains under pressure, i.e., pressurized, throughout the entire fuel supply line and the fuel return conduit.

For example, in the embodiments exemplarily illustrated in FIGS. 1 through 10, the fuel pump 70 disposed within the fuel tank 18 (e.g., within the interior space 74 of the fuel tank 18) draws fuel from within the fuel tank 18 into the fuel pump 18 through the uptake base 70A and pumps or forces the fuel out of the outlet nozzle 70B and into and through the pump egress supply conduit 94. Accordingly, the fuel is under pressure (i.e., pressurized) as it exits the fuel pump 70 (particularly as it exits the fuel tank 18) and as it flows through the entire length of the pump egress supply conduit 94. The fuel, still under pressure (i.e., pressurized), then flows through the interstitial supply conduit 102 and enters the engine supply conduit 86, via the tank supply port 82. The fuel, still under pressure (i.e., pressurized), then flows through the engine supply conduit 86 and the remainder of the fuel supply line to the engine 22. Additionally, since the fuel is under pressure (i.e., pressurized) throughout the entire length of the engine supply conduit 86 and the entire length of the remainder of the fuel supply line, any fuel directed back to the fuel tank 18, via the fuel return conduit, is also under pressure (i.e., pressurized) throughout the entire length of the fuel return conduit. Accordingly, having the fuel pump 70 disposed within the fuel tank 18, whereby the fuel is pressurized prior to exiting the fuel tank 18, and as result, is subsequently pressurized throughout the entire fuel supply line and the entire fuel return conduit prevents extreme and harsh ambient environmental temperatures from vapor bubbles (i.e., vapor lock) from forming with the entire fuel supply line and the entire fuel return conduit.

Additionally, the fuel tank assembly 14, particularly the fuel tank 18, of the present disclosure is structured such that the fuel tank 18 can be used to replace existing fuel tanks in existing vehicle 10 without the need to make any major alterations to the remainder of the vehicle 10. That is, the fuel tank 18 of the present disclosure is retrofittable into existing vehicle 10 without having to modify the chassis 26 or any other frame and support structures of the vehicle 10. More specifically, the fuel tank 18 is structured such that the tank supply port 82 the fuel return port 106 and the fuel drain port 110 are located is the same location as existing fuel tank. Therefore, an existing fuel tank can be removed along with the portion of the fuel supply line extending between the fuel tank and the fuel pump that is located exteriorly to the fuel tank and exposed the ambient environment. Subsequently, the fuel tank 18 of the present disclosure, can be mounted in the same location and in the same manner as the removed fuel tank, and the engine supply conduit can be connected at a first end to the tank supply port 82 of the fuel tank 18 and at a second end to the portion of the existing fuel supply to which the removed exterior fuel pump was connected. Furthermore, as one of skill in the art would readily understand, the fuel tank assembly 14 of the present disclosure can be installed during assembly of new vehicles 10.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A fuel tank assembly comprising:
- a fuel tank having one or more walls;
- a fuel pump disposed within an interior space of the fuel tank;
- a tank supply port disposed in and extending through a wall of the one or more walls, the tank supply port fluidly connected to the fuel pump
- an engine supply conduit connectable to the tank supply port such that the engine supply conduit is fluidly connected to the fuel pump; and
- a pump egress supply conduit that is removably connectable at a first end to a pump egress port, and removably connectable at a second end to a tank reentry port such that the pump egress supply conduit is disposed exteriorly to the fuel tank and is fluidly connected to the fuel pump.

2. The fuel tank assembly of claim 1 further comprising an interstitial supply conduit that is connected at a first end to the reentry port, and connected at a second end to the tank supply port such that the interstitial supply conduit is disposed within the interior space of the fuel tank and is fluidly connected to the fuel pump, thereby fluidly connecting the engine supply conduit to the fuel pump.

3. The fuel tank assembly of claim 1 further comprising a protective fuel tank cover that is structured and operable to be disposed over two or more sides of the fuel tank when the fuel tank is secured to a vehicle.

4. The fuel tank assembly of claim 3, wherein the protective fuel tank cover comprises an access opening formed within the protective fuel tank cover to provide access to the fuel pump.

5. The fuel tank assembly of claim 4, wherein the protective fuel tank cover further comprises an access opening cover plate that is removably connectable to the protective fuel tank cover to cover the access opening.

6. The fuel tank assembly of claim 1 further comprising a fuel return port disposed in and extending through one of:
- the same wall of the one or more walls as the tank supply port; and
- a different wall of the one or more walls as the tank supply port,
- wherein the fuel return port is structured and operable to be connectable to a fuel return conduit of a vehicle in which the fuel tank assembly is disposed.

7. The fuel tank assembly of claim 1 further comprising a fuel drain port disposed in and extending through one of:
- the same wall of the one or more walls as at least one of the tank supply port and the fuel return port; and
- a different wall of the one or more walls as at least one of the tank supply port and the fuel return port,
- wherein the fuel drain port is structured and operable to provide controllable drainage of fuel from the fuel tank.

8. A fuel tank assembly comprising:
- a fuel tank having at least one wall;
- a fuel pump disposed within an interior space of the fuel tank;
- a tank supply port disposed in and extending through one wall of the at least one wall of the fuel tank, the tank supply port fluidly connected to the fuel pump;
- an engine supply conduit connectable to the tank supply port such that the engine supply conduit is fluidly connected to the fuel pump;
- a pump egress supply conduit that is removably connectable at a first end to a pump egress port, and removably connectable at a second end to a tank reentry port such that the pump egress supply conduit is disposed exteriorly to the fuel tank and is fluidly connected to the fuel pump; and
- an interstitial supply conduit that is connected at a first end to the reentry port, and connected at a second end to the tank supply port such that the interstitial supply conduit is disposed within the interior space of the fuel tank and is fluidly connected to the fuel pump, thereby fluidly connecting the engine supply conduit to the fuel pump.

9. The fuel tank assembly of claim 8 further comprising a protective fuel tank cover that is structured and operable to be disposed over two or more sides of the fuel tank when the fuel tank is secured to a vehicle.

10. The fuel tank assembly of claim 9, wherein the protective fuel tank cover comprises an access opening formed within the protective fuel tank cover to provide access to the fuel pump.

11. The fuel tank assembly of claim 10, wherein the protective fuel tank cover further comprises an access opening cover plate that is removably connectable to the protective fuel tank cover to cover the access opening.

12. The fuel tank assembly of claim 8 further comprising a fuel return port disposed in and extending through one of:
- the same wall, of the at least one wall, as the tank supply port; and
- a different wall, of the at least one wall, as the tank supply port, wherein the fuel return port is structure and operable to be connectable to a fuel return conduit of a vehicle in which the fuel tank assembly is disposed.

13. The fuel tank assembly of claim 8 further comprising a fuel drain port disposed in and extending through one of:

the same wall, of the at least one wall, as at least one of the tank supply port and the fuel return port; and a different wall, of the at least one wall, as at least one of the tank supply port and the fuel return port, wherein the fuel drain port is structured and operable to provide controllable drainage of fuel from the fuel tank.

14. A vehicle comprising;

a chassis;

a plurality of wheels operatively connected to the chassis;

a passenger compartment supported by the chassis; and a fuel tank assembly, the assembly comprising:

a fuel tank having at least one wall;

a fuel pump disposed within an interior space of the fuel tank;

a tank supply port disposed in and extending through a wall of the at least one wall of the fuel tank, the tank supply port fluidly connected to the fuel pump an engine supply conduit connectable to the tank supply port such that the engine supply conduit is fluidly connected to the fuel pump; and a pump egress supply conduit that is removably connectable at a first end to a pump egress port, and removably connectable at a second end to a tank reentry port such that the pump egress supply conduit is disposed exteriorly to the fuel tank and is fluidly connected to the fuel pump.

15. The vehicle of claim 14, wherein the fuel tank assembly further comprises an interstitial supply conduit that is connected at a first end to the reentry port, and connected at a second end to the tank supply port such that the interstitial supply conduit is disposed within the interior space of the fuel tank and is fluidly connected to the fuel pump, thereby fluidly connecting the engine supply conduit to the fuel pump.

16. The vehicle of claim 14, wherein the fuel tank assembly further comprises a protective fuel tank cover that is structured and operable to be disposed over two or more sides of the fuel tank when the fuel tank is secured to a vehicle.

17. The vehicle of claim 16, wherein the protective fuel tank cover comprises an access opening formed within the protective fuel tank cover to provide access to the fuel pump.

18. The vehicle of claim 17, wherein the protective fuel tank cover further comprises an access opening cover plate that is removably connectable to the protective fuel tank cover to cover the access opening.

19. The vehicle of claim 14, wherein the fuel tank assembly further comprises a fuel return port disposed in and extending through one of:

the same wall, of the at least one wall, as the tank supply port; and a different wall, of the at least one wall, as the tank supply port, wherein the fuel return port is structured and operable to be connectable to a fuel return conduit of a vehicle in which the fuel tank assembly is disposed.

20. The vehicle of claim 14, wherein the fuel tank assembly further comprises a fuel drain port disposed in and extending through one of:

the same wall, of the at least one wall, as at least one of the tank supply port and the fuel return port; and a different wall, of the at least one wall, as at least one of the tank supply port and the fuel return port, wherein the fuel drain port is structured and operable to provide controllable drainage of fuel from the fuel tank.

* * * * *